Jan. 2, 1934.    D. W. SHORT    1,941,628
SCANNING METHOD AND APPARATUS
Filed Nov. 4, 1930
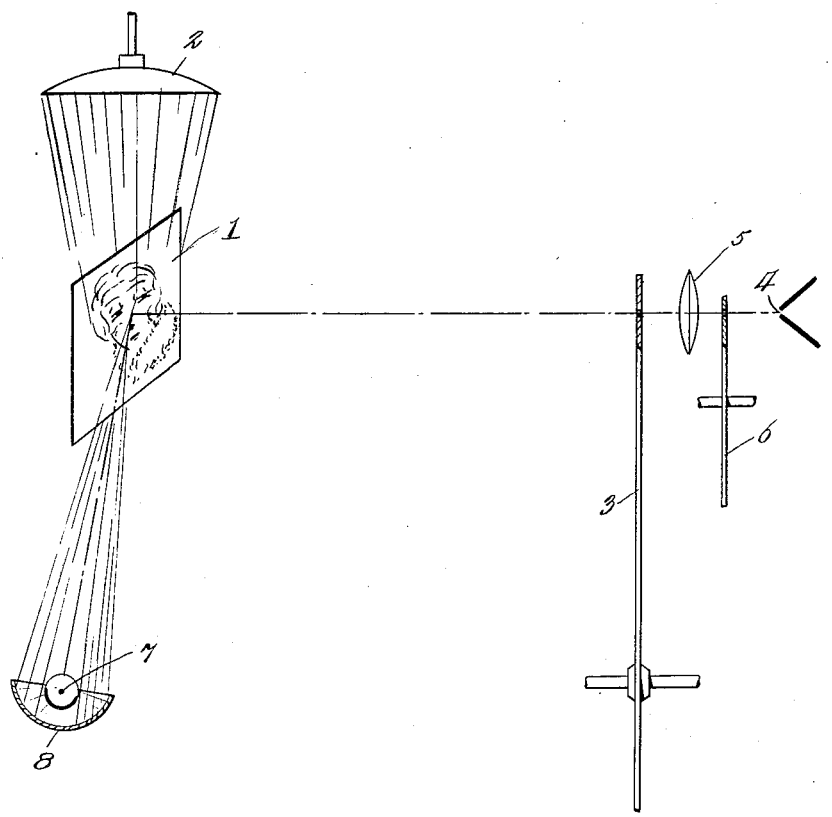
Donald William Short
INVENTOR
BY
Darby & Darby
ATTORNEYS Patented Jan. 2, 1934

1,941,628

UNITED STATES PATENT OFFICE 1,941,628

SCANNING METHOD AND APPARATUS

Donald William Short, Palisades Park, N. J., assignor to Jenkins Television Corporation, Jersey City, N. J., a corporation of Delaware Application November 4, 1930. Serial No. 493,279

6 Claims. (Cl. 178—6)

This invention relates to electro-optical systems and with particularity to scanning methods for television systems.

An object of the invention is to provide an improved technique for scanning objects in television and similar systems.

A feature of the invention relates to the method of scanning an object or subject by exposing it to a moving light spot which has a color chosen in accordance with the average color of the normal lighting of the subject or object.

Under certain conditions, particularly in so-called direct pick-up television systems, the subject or object may be exposed to particular colored lights. For example, in theatres the stage illumination is generally made up of different colored lights which may be rendered selectively effective or effective in predetermined combinations to provide the proper illumination of the actors or scenic effects. If an attempt is made to televise or scan such a selectively illuminated scene the response of the photo-electric apparatus will be different for different characters of coloring. For example, assuming that during one stage of the scene the objects are illumined with a substantially red light, or with a light having a predominating red characteristic, then obviously the photo-electric apparatus in the television pick-up device will have a different response than that attained should the scene or subject be illuminated with a blue or yellow light. This is particularly true in the case of shadow effects. In other words, when a subject or object is normally illuminated by reddish light and a scanning spot of one color is employed, certain shadow effects will exist in the reproduced television image. On the other hand, should the normal or flood lighting of the subject change to bluish or yellowish, then a different shadow effect will be produced.

In accordance with the present invention it is proposed to employ a scanning spot which has the same relative range as regards light frequency as the normal or flood lighting of the subject or object being scanned.

There is shown schematically in the drawing one illustrative manner of carrying out this procedure. In the drawing the numeral 1 represents the subject to be scanned which may be exposed to a normal lighting or flood lighting by any well known means, for example the object 1 may represent a portion of the scenery upon the stage of a theatre which is exposed for example, to reddish light from a flood light source 2. For the purpose of scanning the subject 1 there is provided any well known type of scanner 3, such as a disc, drum, band, or the like, provided with scanning elements or perforations. A source of high intensity light such as an arc lamp 4 is provided, and this light is projected upon the scanning field of the device 3 by suitable optical system 5. Interposed between the light source 4 and the disc 3 is a color filter 6 which may take the form of a wheel having different colored sectors depending upon the color of light that is to be used for scanning. In accordance with the present invention it is proposed to choose a sector of the disc 6 corresponding in color to the average color due to the normal illumination of the subject 1. Thus, if the flood light 2 is illuminating the subject 1 with a reddish light, then the disc 6 would be rotated to bring the red sector in alignment with the light from source 41. Any suitable photo-electric pick-up system may be employed. However, it is preferred to employ a system of the type disclosed in the drawing, comprising one or more photoelectric cells 7 positioned substantially at the focus of a concave mirror lens 8.

By well known television principles, as the scanning device 3 rotates it causes a spot of light of the selected color to move rapidly over the subject 1 in the form of a concentrated spot. This spot as it moves over the subject is diffusely reflected and the greater part of the reflected light is collected by the mirror 8 and projected into the cell 7. The current from cell 7 may be amplified and transmitted in the usual manner to a distant television receiving apparatus (not shown).

It has been found that the above described method of selecting the color of the scanning spot in accordance with the average color illumination of the subject enables more faithful reproduction to be obtained, particularly in the reproduced shadow effects. Any suitable type of photo-electric cell may be employed, if desired, however, a series of photo-electric cells having different color responses may be employed. For example, if the subject is normally flood lighted with a reddish light, and therefore a reddish scanning spot is employed, then it may be desirable to employ photo-electric cells selectively responsive to the red rays, or ordinary cells may be employed with red filters in front of them. However, good results may be attained by employing ordinary pan-chromatic cells and merely selecting the color of the scanning spot to correlate it with the normal color of the flood lighting of the spot.

While specific structures and arrangements of apparatus are shown in the drawing, it will be understood that the invention is not limited thereto, and that various changes and modifications may be made without departing from the spirit and scope of the invention.

What is claimed is:

1. The method of scanning which comprises flooding a subject or object with light of a selected color, moving a scanning spot over the subject or object while it is flood lighted, and selecting the color of said spot in accordance with the average normal coloring of the said flood light to control the shadow effects desired in reproduction.

2. The method of scanning which comprises flooding a subject or object with light of a selected color, moving a scanning spot over the subject or object while it is flood lighted, and varying the color of said scanning spot in accordance with the color of the flood light to control the shadow effects desired in reproduction.

3. The method of scanning which comprises exposing an object or subject to be scanned to a normal illumination, exposing the subject or object to a moving scanning spot, and varying the color of said spot in accordance with shadow effects desired in reproduction.

4. In an electro-optical system the combination of means for flooding a subject or object to be scanned with light of a selected color, a movable scanning spot, and means for varying the color of said spot to correspond with the average coloring of said flood light to control the shadow effects desired in reproduction.

5. In an electro-optical system the combination of means for normally illuminating a subject or object with a flood light of selected color, means for moving a scanning spot over said subject or object, and means for varying the color of said spot in accordance with the color of the flood light to control the shadow effects desired in reproduction.

6. In an electro-optical system the combination of means for flooding a subject or object to be scanned with light of a selected color, a scanning spot, a color filter for varying the color of said scanning spot in accordance with the average color of the flood light to control the shadow effects desired in reproduction.

DONALD WILLIAM SHORT.